United States Patent
Muranaka et al.

(10) Patent No.: US 10,783,470 B2
(45) Date of Patent: Sep. 22, 2020

(54) SCHEDULE MANAGEMENT SYSTEM

(71) Applicant: Shibuya Corporation, Kanazawa-shi, Ishikawa (JP)

(72) Inventors: Shiaru Muranaka, Kanazawa (JP); Kenji Yoneda, Kanazawa (JP); Hiroshi Utsumi, Kanazawa (JP)

(73) Assignee: SHIBUYA CORPORATION, Kanazawa-shi, Ishikawa (JP)

( * ) Notice: Subject to any disclaimer, the term of this patent is extended or adjusted under 35 U.S.C. 154(b) by 119 days.

(21) Appl. No.: 15/550,574

(22) PCT Filed: Jan. 22, 2016

(86) PCT No.: PCT/JP2016/051795
§ 371 (c)(1),
(2) Date: Aug. 11, 2017

(87) PCT Pub. No.: WO2016/132812
PCT Pub. Date: Aug. 25, 2016

(65) Prior Publication Data
US 2018/0240059 A1 Aug. 23, 2018

(30) Foreign Application Priority Data
Feb. 18, 2015 (JP) .................... 2015-029953

(51) Int. Cl.
*G06Q 10/06* (2012.01)
*G06Q 50/04* (2012.01)
*G05B 19/418* (2006.01)

(52) U.S. Cl.
CPC . *G06Q 10/06314* (2013.01); *G05B 19/41865* (2013.01); *G06Q 10/06316* (2013.01);
(Continued)

(58) Field of Classification Search
None
See application file for complete search history.

(56) References Cited

U.S. PATENT DOCUMENTS 5,442,561 A * 8/1995 Yoshizawa ....... G05B 19/41865
700/100
7,541,164 B2 * 6/2009 Schilling .......... C07K 14/70521
424/143.1
(Continued)

FOREIGN PATENT DOCUMENTS

JP 06-075975 A 3/1994
JP 06-266413 A 9/1994
(Continued)

OTHER PUBLICATIONS

International Search Report for PCT/JP2016/051795 (2 pgs.).

*Primary Examiner* — Mohammad Ali
*Assistant Examiner* — David Earl Ogg
(74) *Attorney, Agent, or Firm* — Flynn Thiel, P.C.

(57) ABSTRACT

A schedule management system 1 having isolators 3 (production facilities) and a main control device 4 for managing a production schedules of all the isolators 3. The production process of each isolator constituting the production schedule has a plurality of sub-processes, the production status being determined in the sub-process. The main control device 4 adds a new separating operation to the passage process and performs an update when the main control device 4 obtains a determination result that the separation of cells in a separation state confirmation operation (sub-process) in the passage process is insufficient while a passage process for cells A is being carried out in the isolators. The main control device 4 alters the start time of a culture medium exchange process for other cells B different from the updated passage operation, and updates the production schedule.

5 Claims, 3 Drawing Sheets

(52) U.S. Cl.
CPC .......... *G06Q 50/04* (2013.01); *G05B 19/418* (2013.01); *G05B 2219/31429* (2013.01)

(56) References Cited

U.S. PATENT DOCUMENTS

| | | | | |
|---|---|---|---|---|
| 2005/0096957 | A1* | 5/2005 | Bayoumi | G06Q 10/06312 |
| | | | | 705/7.22 |
| 2005/0171963 | A1* | 8/2005 | Barrett | G06Q 10/06 |
| 2005/0228524 | A1* | 10/2005 | Hayashi | G05B 19/41865 |
| | | | | 700/101 |
| 2008/0172280 | A1* | 7/2008 | Goulimis | G06Q 10/06 |
| | | | | 705/7.25 |
| 2015/0220081 | A1* | 8/2015 | Morita | G05B 19/41865 |
| | | | | 700/99 |
| 2015/0261216 | A1* | 9/2015 | Yasuma | G05B 19/41865 |
| | | | | 700/100 |

FOREIGN PATENT DOCUMENTS

| | | |
|---|---|---|
| JP | 08-287156 A | 11/1996 |
| JP | 2001-222609 A | 8/2001 |
| JP | 2009-075631 A | 4/2009 |
| JP | 2012-231811 A | 11/2012 |
| JP | 2014-160422 A | 9/2014 |

\* cited by examiner (a) INITIALLY PLANNED SCHEDULE (b)

(c)

(d)

SCHEDULE MANAGEMENT SYSTEM

TECHNICAL FIELD

The present invention pertains to a schedule management system and more particularly to a schedule management system having a plurality of production facilities performing the production of products on the basis of a plurality of production processes and a main control device for managing the production process of each of the production facilities and for managing a production schedule composed of the production processes of all the production facilities.

BACKGROUND ART

Conventionally, a schedule management system having a plurality of production facilities performing the production of products on the basis of a plurality of production processes and a main control device for managing the production process of each of the production facilities and for managing a production schedule composed of the production processes of all the production facilities is known.

As such a schedule management system, a system that recognizes launch and completion of each production process in each production facility, determines whether each production process has been advanced in accordance with a production schedule set in advance, and offers the determination result for determining a modification of the production schedule after the end of the production is known (Patent Literature 1).

Moreover, also in the field of regenerative medicine in which researches have been made recently, a plurality of production facilities are used for the culturing of cells as products, and the production schedule management using the aforementioned main control device is carried out also for these production facilities (Patent Literature 2).

PRIOR ART DOCUMENTS

Patent Literature

Patent Literature 1 Japanese Patent Laid-Open No. 6-75975 Patent Literature 2 Japanese Patent Laid-Open No. 2012-231811

SUMMARY OF INVENTION

Problems to be Solved by the Invention

Here, in the field of regenerative medicine as described in the aforementioned Patent Literature 2, since there is a variation in the culture speed of cells as products due to an individual difference, extension or reduction of the production process is needed in some cases in actuality such that an additional culture process becomes necessary or, to the contrary, required operations are omitted, for example, as compared with general industrial products targeted by Patent Literature 1.

However, in Patent Literature 1, though launch and completion of each production process are recognized, the production schedule is configured to be updated by a worker, and in Patent Literature 2, too, only the production schedule at the beginning of a plan is prepared, and an appropriate update of the production schedule according to the culture speed of the cells after the starting of the production is not performed.

In view of such problems, the present invention provides a schedule management system which can manage the production schedule by updating the production process when the addition or omission of the operation in the production process becomes necessary.

Means for Solving the Problems

That is, a schedule management system according to the invention of claim 1 is characterized in that, in a schedule management system having a plurality of production facilities for producing products on the basis of a plurality of production processes and a main control device for managing the production process of each production facility and for managing a production schedule composed of the production processes of all the production facilities, the production process comprises a plurality of sub-processes, and in the sub-processes, the production status is determined, the main control device is capable of updating a first production process by adding a new sub-process to the first production process or by deleting an existing sub-process of the first production process on the basis of a determination result from the sub-process configuring the first production process while the required first production process is being carried out in the production facility, and the main control device is further capable of updating the production schedule by updating a second production process different from the first production process on the basis of the update of the first production process.

Advantageous Effect of Invention

According to the invention, after the production facility is operated and the first production process is started, a determination result on a quality of the product, for example, is provided in the sub-process in the first production process, and when the determination result is defective, the main control device can extend or reduce the first production process on the basis of the determination result.

Moreover, the main control device can update the production schedule by updating the start time of the second production process to be different from the first production process in accordance with this updated first production process.

As described above, even if the production process is extended or reduced, the production process can be continued by the production schedule updated correspondingly to that.

MODE FOR CARRYING OUT THE INVENTION

Figure 1:
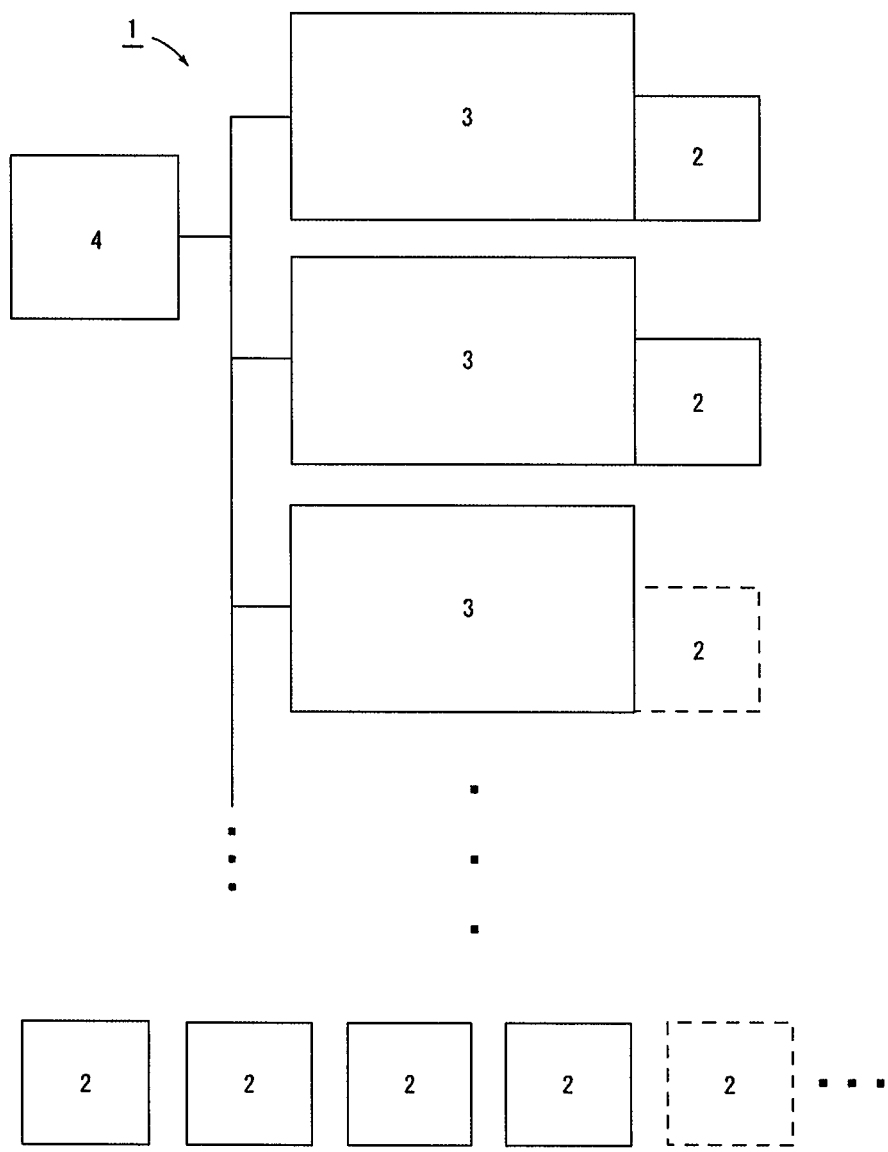
FIG. 1 is a configuration diagram of a schedule management system according to this embodiment.

An illustrated embodiment will be described below, in which FIG. 1 illustrates a configuration diagram of a schedule management system 1, and in the schedule management system 1, a production schedule for culturing cells of a tissue sampled from a patient used in the field of regenerative medicine as a product is managed.

The aforementioned schedule management system 1 comprises a plurality of incubators 2 accommodating cells to be cultured therein, a plurality of isolators 3 provided connectably to the incubators 2 and as production facilities for performing a culture process as a production process for culturing the cells therein, and a main control device 4 for controlling the plurality of isolators 3.

The incubator 2 has its inside maintained in an aseptic state and in an environment suitable for cell culturing and is capable of accommodating a plurality of culture vessels accommodating cells. The incubator 2 is moved manually and stored at a position separated from the isolator 3 while the culturing process in the isolator 3 is not performed so that the cells are cultured therein.

An inside of the isolator 3 is also maintained in the aseptic state, and robots and various devices for performing the culture process are provided therein, and the robots and each device in each isolator 3 are controlled by control means, not shown, provided in each isolator 3, respectively.

The incubator 2 and the isolator 3 are connectable by connecting means, not shown, and by leaving an opening/closing door constituting the connecting means open, the culture vessel can be transferred between the incubator 2 and the isolator 3 while the aseptic state is maintained.

The incubator 2, the isolator 3, the connecting means, and the robots and various devices provided in the isolator 3 are conventionally known, and detailed explanation on them is omitted.

Figure 2:
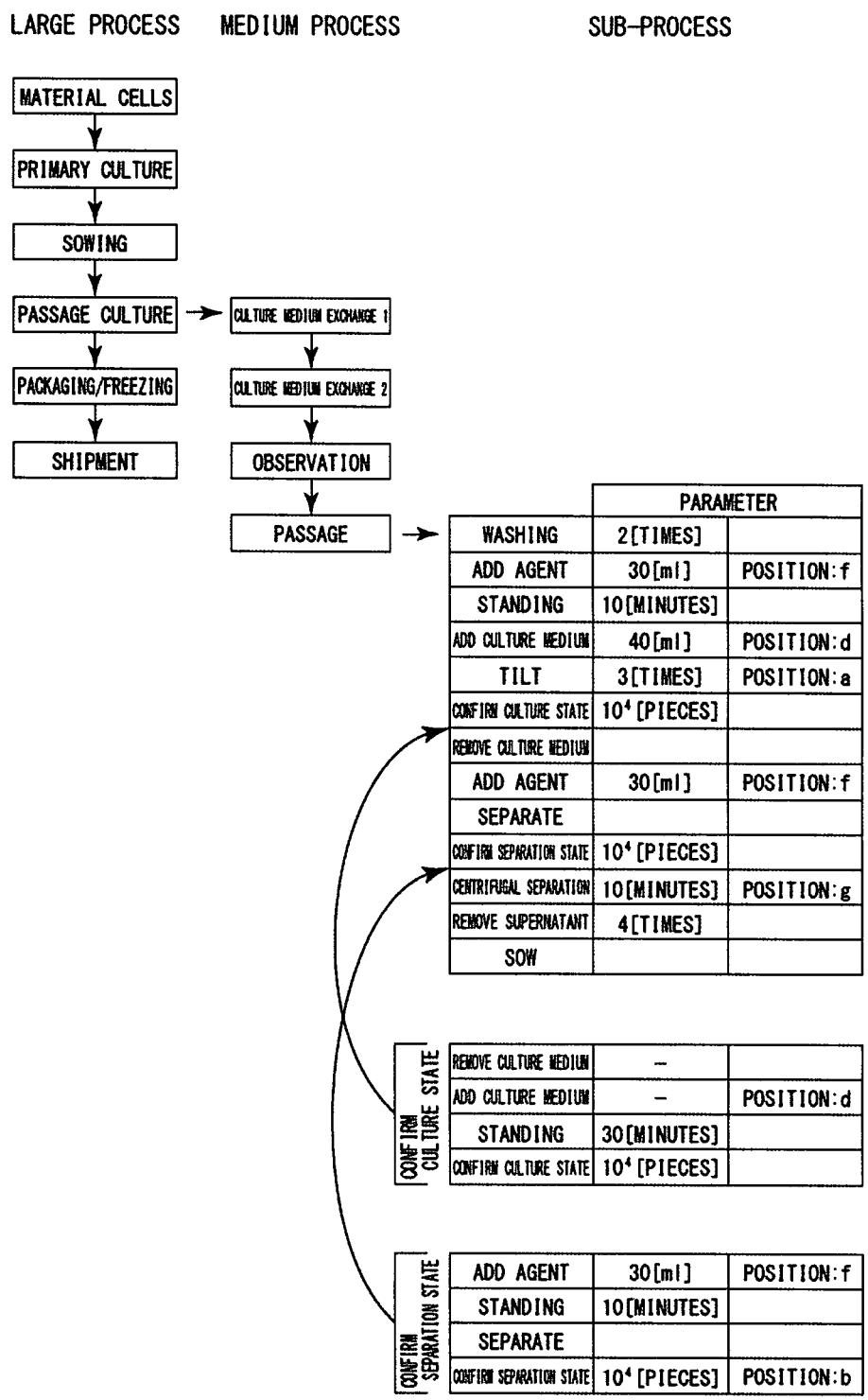
FIG. 2 is a view for explaining a large process, a medium process, and a sub-process configuring a culture process.
Figure 3:
FIG. 3 is a view for explaining update of a production schedule by a main control device.
Figure 3:
Figure 3:

The main control device 4 is communicably connected to the control means of each isolator 3, manages the culture process performed in each isolator 3 illustrated in FIG. 2, and manages the production schedule of all the culturing processes performed in all the isolators 3 as illustrated in FIG. 3.

In the production schedule illustrated in FIG. 3, cells A to I of different kinds and first to third isolators 3 capable of performing the same culturing process are used in explanation, but handling of cells of more kinds and use of more units of the isolators 3 are also possible, and control of other devices, not shown, required for cell culture is also possible.

The cells A to I are different in patients from whom they are sampled or tissues from which they are sampled, respectively, and the periods of time required for culturing are different, respectively, and their shipment timing is set in accordance with a schedule of a surgery or the like in which these cells are used.

First, the culturing process performed in the first to third isolators 3 can be classified, into a large process, a medium process as a production process according to the present invention, and a sub-process as illustrated in FIG. 2.

The large process includes a material cell treatment process of bringing the material cells sampled from the patient into a state suitable for culturing, a primary culturing process of culturing the cells treated in the material cell treatment process, a sowing process of sowing the cells obtained in the primary culturing process in a plurality of culture vessels, a passage culturing process of further distributing the cells cultured in the incubator 2 into a plurality of culture vessels, a packaging/freezing process of packaging/freezing the cultured cells for shipment, and a shipment process of bringing the packaged/frozen cells into a shippable state.

By taking the passage culturing process in them as an example, the passage culturing process comprises two sessions of a culture medium exchange process of exchanging a culture medium in the culture vessel, an observation process for observing a cultured state of the cells during culture, and a passage process of the cells in the culture vessel as medium processes.

By further taking the passage process as an example, the passage process comprises a washing operation for washing the cells in the culture vessel, an agent adding operation of adding an agent to the culture vessel, a standing operation of standing the culture vessel for a predetermined time, a culture medium adding operation of adding a culture medium in the culture vessel, a tilting operation of tilting the culture vessel so as to blend an additive to an entire bottom part of the culture vessel, a culture state confirmation operation of confirming the culture state of the cells, a culture medium removing operation of removing the culture medium from the culture vessel, a separating operation of separating the cells from the culture vessel, a separation state confirmation operation of confirming a separation state of the cells separated from the culture vessel, a centrifugal separating operation of performing centrifugal separation, a supernatant removing operation of removing the supernatant from a liquid which was centrifugally separated, a sowing operation of suspending the cells in the culture medium for sowing and the like as sub-processes.

In the sub-processes, parameters as one or a plurality of pieces of instruction data or index data can be set as necessary, respectively.

For the aforementioned standing operation, for example, a parameter is set for the standing time of the cells in the culture vessel, and for the centrifugal separating operation, a parameter for time for centrifugal separation is set.

For the agent adding operation, a parameter on the type or amount to be used is set, and particularly for the types of agents, a position in the isolator 3 where a container accommodating the agent is installed can be parameterized as result data.

Moreover, in the culture state confirmation operation and the separation state confirmation operation as the sub-processes, determination on the cultured state of the cells is made, and a required threshold value is set as a parameter.

For the cultured state confirmation operation, the number of cells in the culture vessel observed by an observing device provided in the isolator 3 is set as a parameter, and when the number of cells as the result data obtained by the observation exceeds this parameter, it is determined that the culturing has been performed favorably, while if not, it is determined that the culturing is defective.

A predetermined range can be set as the parameter, and it may be so configured that, when the number of cells as the result data obtained by the observation is within this range of parameter, it is determined that the culturing has been performed favorably, while if not, it is determined that the culturing is defective.

In the separation state confirmation operation, the number of cells separated from the culture vessel similarly observed by the observing device or a rate of the separated cells is set as a parameter, and when the result data of the number or the rate of separated cells exceeds the parameter, it is determined that the separation has been performed favorably, while if not, it is determined that separation is defective.

In the sub-processes other than the culturing state confirmation operation or the separation state confirmation operation, too, qualities of these operations can be determined by parameterizing necessity of execution of each sub-process, a failure of a device, presence of unnecessary vibration or the like as result data.

The large processes, medium processes, sub-processes and their orders as the culturing processes as described above are only examples, and culturing processes not described here can be naturally set as the large processes, medium processes, and sub-processes.

The main control device 4 sets optimal large processes, medium processes, and sub-processes for each of the cells in accordance with the types of the cells A to I to be targets or the shipment timing set and prepares an initially planned schedule combining the medium processes as illustrated in FIG. 3(a) in accordance with operation states of the first to third isolators 3.

In this embodiment, as the initially planned schedule, the passage process for the cells A, the culture medium exchange process for the cells B, the culture medium exchange process for the cells C are set for the first isolator 3, the culture medium exchange process for the cells F and the passage process for the cells G are set for the second isolator 3, and the passage process for the cells H and the culture medium exchange process for the cells I are set for the third isolator 3.

In order to perform each medium process in each isolator 3, an inside of the isolator 3 needs to be decontaminated in advance, and the inside of the isolator 3 is decontaminated at start of an operation, and a decontaminating process is set between the preceding medium process and the subsequent medium process, respectively.

The decontaminating process comprises an operation of filling the isolator 3 with a decontamination gas such as hydrogen peroxide steam and an aeration operation of discharging it, and particularly the aeration operation needs a required time.

In the schedule illustrated in FIG. 3, the first and third isolators 3 have been already decontaminated at the start of the operation, and the passage process for the cells A and the passage process for the cells H can be started immediately, while in the second isolator 3, since the inspection is conducted at the start of the operation, the decontaminating process is set after the inspection is finished.

Moreover, when each medium process is to be performed, an operation that a worker connects the incubator 2 accommodating the cells as targets of each process to the targeted isolator 3 is needed, and the main control device 4 gives a required instruction to the worker when each process is to be performed.

The worker who saw the instruction connects the incubator 2 to the isolator 3 while the decontaminating process set between the preceding and subsequent processes is being performed, for example, and when the decontaminating process is completed, the opening/closing door of the connecting means is opened so that the incubator 2 and the isolator 3 communicate with each other.

Moreover, when the main control device 4 prepares the initially planned schedule, priority can be set for the large process and the medium process for each cell by considering the due date or required quantity of the cells, the cost required until the culturing is finished and the like.

As the priority, the cost required for an amount of electric power used in each sub-process or consumables such as chemicals used can be considered, and when the main control device 4 constitutes the medium process by combining the sub-processes, the priority is set on the basis of the cost required in the medium process.

Moreover, when the main control device 4 prepares the initially planned schedule, it can make settings such that the same medium process for the same cells is performed at the same time in the plurality of isolators 3 as necessary so that the risk can be distributed for a process with a good possibility of a failure, and other conditions can be also set.

Furthermore, the main control device 4 can display the calculated cost or time required for each culturing process on display means, not shown, or can output them as a report or the like on the prepared initially planned schedule.

On the basis of the initially planned schedule illustrated in FIG. 3(a) prepared as above, the main control device 4 operates the first to third isolators, and the culturing process is performed in these first to third isolators, respectively.

However, the medium process and the sub-process are set on the basis of the past experiences or the like, and the culturing can take time depending on the individual difference of the cells, or separation of the cells from the culture medium can be insufficient in some cases, and to the contrary, when the culturing advances beyond expectation, an operation requiring repetition is omitted in some cases.

Thus, in the main control device 4 of this embodiment, when the addition or omission of the operation is required on the basis of the culturing state of the cells in the culturing process in each isolator set in the initially planned schedule, the culturing process is updated and the production schedule including the culturing process is updated, and the culturing process is continued in accordance with the updated production schedule.

When it is determined that the cell culturing is insufficient in the culturing state confirmation operation constituting the passage process after the passage process is started in the isolator, for example, the main control device 4 adds the culture medium removing operation, the culture medium adding operation, and the standing operation again immediately after the culturing state confirmation operation as illustrated in FIG. 2 and also adds the culturing state confirmation operation.

As a result, the cell culturing is performed again, and when it is determined that the cell culturing has been sufficiently performed in the added culturing state confirmation operation, the main control device 4 performs the culture medium removing operation set after that.

Similarly to that, in the separation state confirmation operation in the passage process, when it is determined that the cells have not been sufficiently separated from the culture vessel, the main control means 4 adds the agent adding operation, the standing operation, and the cell separating operation again immediately after the separation state confirmation operation as illustrated in FIG. 2 and further adds the separation state confirmation operation after that.

As a result, the cell separating operation is performed again, and when it is determined that the cells have been sufficiently separated in the added separation state confirmation operation, the main control device 4 performs the centrifugal separating operation set after that.

In the schedule management system 1 of this embodiment as described above, even after the medium process has been performed in each isolator 3, if a determination result that the culturing state or the separation state of the cells is defective is provided in the culturing state confirmation operation or the separation state confirmation operation, the main control device 4 adds a required sub-process to the medium process so that the updated medium process can be performed again.

To the contrary, when it is determined that there is a sub-process which is no longer necessary in the medium process, the main control device 4 can delete the sub-process from the medium process and can perform the updated medium process.

However, when the sub-process is added to or deleted from the medium process as above, end time of the medium process is extended or reduced and thus, the medium process is overlapped with the other subsequent medium processes or an interval is generated between them.

Thus, the main control device 4 of this embodiment is configured to update the entire production schedule by updating the start time of the other medium processes after it updated the required medium process.

FIGS. 3(*b*) to 3(*d*) describe the update procedures of the production schedule when the main control device 4 updates the passage process for the cells A in the first isolator 3.

Here, a case where the cells have not been sufficiently separated in the separation state confirmation operation constituting the passage process and the main control device 4 adds the sub-process relating to the separating operation and the separation state confirmation operation again to the passage process as illustrated in FIG. 2 will be explained.

When the main control device 4 starts performance of each of the medium processes set for the first to third isolators 3 and then, updates the passage process for the cells A as described above so as to extend the end time, as illustrated in FIG. 3(*b*), the main control device 4 puts over the start time of the culture medium exchange process for the B cells and the culture medium exchange process for the C cells subsequent to the passage process to the cells A.

However, the shipment timing for each cell is set as described above, and by calculating backward from this shipment timing, a start allowance period for timing in or after which each medium process constituting the culturing process of each cell should be started at earliest and for timing in or before which it should be started at latest can be acquired.

That is, if the start time of the required medium process is started before the start allowance period, the interval from the subsequent medium process becomes too large, which might hinder the cell culturing, while if it is started after the start allowance period to the contrary, the subsequent medium process can no longer be performed, and the cell cannot be shipped in time.

The main control device 4 of this embodiment recognizes the start allowance period of the culture medium exchange process for the B cells and the culture medium exchange process for the C cells as illustrated in FIG. 3(*b*) when the passage operation for the cells A is updated, and the start time of the culture medium exchange process for the B cells and of the culture medium exchange process for the C cells is put over.

In this embodiment, it is assumed that, as the result of the update of the passage operation for the cells A, the start time of the culture medium exchange process for the B cells is within the start allowance period, while the start time of the culture medium exchange process for the C cells is not contained in the start allowance period.

If the start time of the culture medium exchange process for the C cells is also contained in the start allowance period, the main control device 4 only needs to put over the start time of each process in this first isolator 3 and it does not have to update the other medium processes in the second and third isolators 3.

When it is determined that the start time of the culture medium exchange process for the C cells is not contained in the start allowance period as above, the main control device 4 confirms the start time and the start allowance period of each of the other medium processes set for the second and third isolators 3.

In FIG. 3(*b*), since the culture medium exchange process for the cells F and the passage process for the cells H have been already performed in the second and third isolators 3, respectively, the exchange cannot be performed in these medium processes.

Thus, the main control device 4 recognizes the start time and the start allowance period of each of the passage process for the cells G in the second isolator 3 and the culture medium exchange process for the cells I in the third isolator 3.

As illustrated in FIG. 3(*c*), the same start allowance period is set for the passage process for the cells G and the culture medium exchange process for the cells I, respectively, and it does not matter if these medium processes in the second and third isolators 3 are exchanged.

Moreover, when the culture medium exchange process for the cells F is compared with the passage process for the cells H, the end time of the culture medium exchange process for the cells F in the second isolator 3 is set earlier.

Thus, the main control device 4 exchanges the culture medium exchange process for the cells I in the third isolator which ends at earlier time with the passage process for the cells G in the second isolator, and in the second isolator 3, after the culture medium exchange process for the exchanged cells I, a manufacture waiting period decontaminated by the decontaminating process is set.

Then, since the passage process for the cells G and the culture medium exchange process for the cells I are exchanged between the second and third isolators 3, as illustrated in FIG. 3(*d*), the start time of the manufacture waiting period subsequent to the culture medium exchange process for the cells I is contained in the start allowance period of the culture medium exchange process for the cells C in the second isolator 3.

Thus, the main control device 4 exchanges the culture medium exchange process for the cells C in the first isolator 3 and the manufacture waiting period subsequent to the culture medium exchange process for the cells I in the second isolator 3, whereby an update of the production schedule is completed. Then, shipment at the shipment timing set for the cells C is made possible.

As described above, the main control device 4 updates the production schedule by exchanging each process performed in the first to third isolators 3 as appropriate, whereby all the culturing processes set for the first to third isolators 3 can be started within the appropriate start allowance period.

Then, the main control device 4 continues the culturing process on the basis of this updated operation schedule and if an extension or reduction is generated in the required medium process, the production schedule is updated again by the procedure as described above.

In the aforementioned embodiment, the incubator 2 is assumed to be moved manually but it may be configured to be self-driven so as to be automatically moved to the isolator 3 on the basis of control by the main control device 4 and to be connected to the isolator 3.

In that case, it is only necessary that the main control device 4 sets an operation process for each incubator 2 concerning time during which the incubator 2 is connected to which isolator 3.

REFERENCE SIGNS LIST

1 schedule management system,
2 incubator,
3 isolator,
4 main control device

The invention claimed is:

1. A schedule management system comprising a plurality of production facilities for producing cell culture products on the basis of a plurality of production processes for producing the cell culture products and a main control device configured to manage the plurality of production processes and manage a cell culture product production schedule made of the plurality of production processes, wherein the plurality of production processes comprises a plurality of sub-processes, and in required sub-processes, a production status is determined by determining a quality of a cell culture product being produced;

the main control device is configured to update a first production process by adding a new sub-process to the first production process or by deleting an existing sub-process of the first production process on the basis of a result of the quality determination of the cell culture product made in a required sub-process in the first production process while the first production process is being carried out; and the main control device is further configured to update the production schedule by updating a second production process different from the first production process on the basis of an update of the first production process, the update of the first production process being performed by adding a new sub-process to the first production process or by deleting an existing sub-process of the first production process, and further, on the basis of the update of the first production process, the update being performed on the basis of the result of the quality determination of the cell culture product made in the required sub-process while the first production process is being carried out, the main control device is configured to update the production schedule by exchanging the production process in a first production facility in which the first production process has been updated and the production process in a second production facility with each other.

2. The schedule management system according to claim 1, wherein the main control device is configured to recognize a start time of a production process in the first production facility and a start time of a production process in the second production facility and recognize a start allowance period of each of these production processes;

when the start time of the production process in the second production facility is within the start allowance period of the production process in the first production facility and the start time of the production process in the first production facility is within the start allowance period of the production process in the second production facility;

the main control device is configured to update the production schedule by exchanging the production process of the first production facility and the production process of the second production facility with each other.

3. The schedule management system according to claim 2, wherein by updating the first production process of the first production facility, if the start time of the production process of the first production facility subsequent to the updated first production process of the first production facility departs from the start allowance period, the main control device is configured to recognize the start time of the required production process in the second production facility; and if the start time of the production process of the second production facility is within the start allowance period of the subsequent production process of the first production facility, the main control device is configured to update the production schedule by exchanging the subsequent production process of the first production facility and the production process of the second production facility with each other.

4. The schedule management system according to claim 1, wherein the main control device is also configured to set priority for each of the production processes and set the production schedule by considering the priority.

5. The schedule management system according to claim 1, wherein the main control device is also configured to calculate a cost or time involved in execution of each sub-process in each production process and calculate a cost or time required for execution of the production schedule from the calculated cost or time.

* * * * *